May 20, 1930.  D. J. HILL  1,759,697
ATTACHMENT TO SCRAPERS AND SCOOPS FOR EARTH AND THE LIKE
Filed Oct. 20, 1928
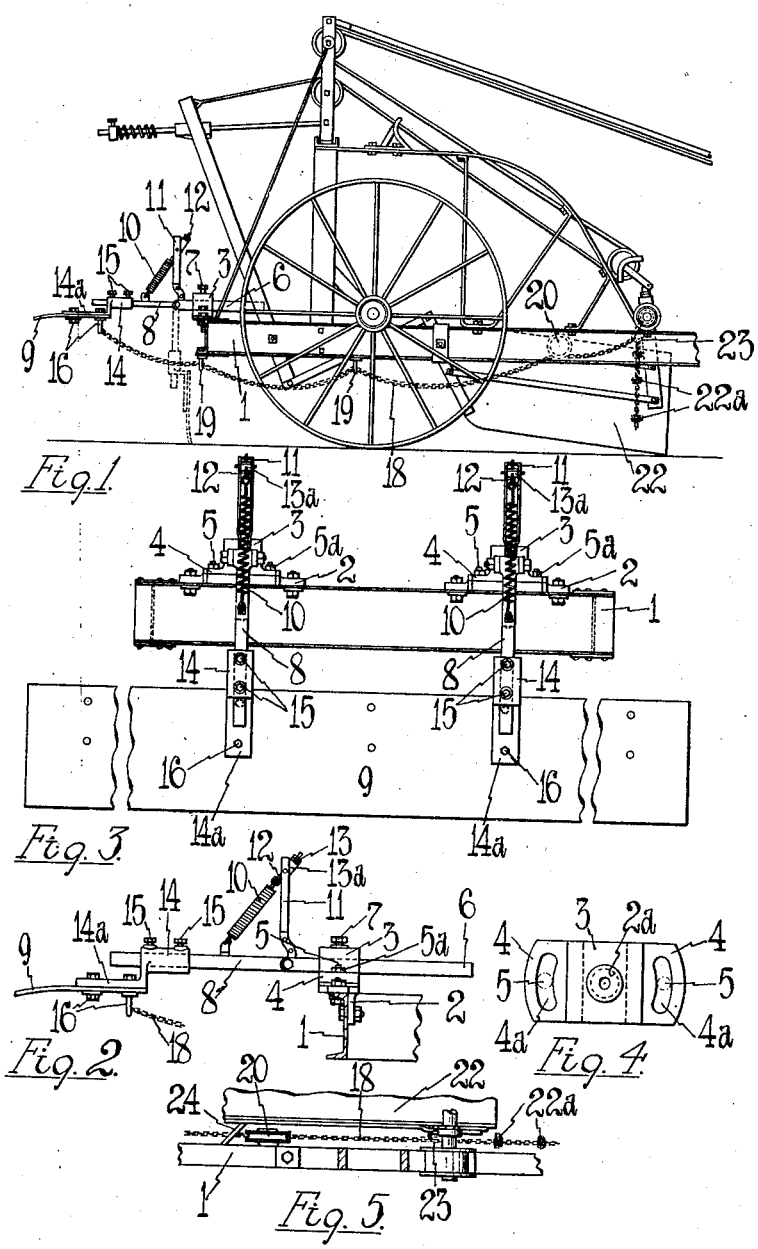

Patented May 20, 1930

1,759,697

UNITED STATES PATENT OFFICE

DAVID JOSEPH HILL, OF GREY LYNN, AUCKLAND, NEW ZEALAND, ASSIGNOR OF ONE-HALF TO JOHN EDWARD HILL, OF AUCKLAND, NEW ZEALAND

ATTACHMENT TO SCRAPERS AND SCOOPS FOR EARTH AND THE LIKE

Application filed October 20, 1928, Serial No. 313,768, and in New Zealand October 28, 1927.

This invention relates to machines used for scraping and scooping up earth and the like, and also capable of being operated after the load has been transported where required, to deliver same from the scoop.

The object of the present invention is to provide for the aforesaid type of machine an attachment, which upon the scoop being tipped to deliver the load, operates to spread the delivered material over the ground, so as to avoid the employment of manual labour for this purpose.

The invention consists in providing on the rear of a scraping or scooping machine an attachment comprising a spreader blade capable of being lowered and raised, and normally maintained in a raised position, connections being provided between the scraper or scoop of the machine and the spreader blade, whereby upon said scraper or scoop being made to deliver its load, the spreader blade is brought to its lowered position, and as the machine moves forward spreads the material delivered from the scraper or scoop.

The construction and mounting of the attachment are illustrated in the accompanying drawing and will be more fully described in conjunction therewith.

Figure 1 being a side view of a scraping or scooping machine fitted with the attachment.

Figure 2 a side view (enlarged) of one of the spreader blade carrying arms.

Figure 3 a rear view of the parts shown in Figure 2,

Figure 4 a plan view of one of the bearer blocks in which the blade carrying arms are mounted, and Figure 5 a detail view partly in section illustrating a guide pulley, and a guard for one of the connecting chains and the attachment of the latter to the scoop.

The attachment is provided by securing on the frame 1 of the machine at or near each end of the rear cross member thereof, brackets 2 which are bolted to the frame, said brackets 2 having mounted thereon by means of central swivel pins 2ª (Figure 4) bearer blocks 3 formed with lugs 4, which rest on the brackets 2 secured to the frame 1, said lugs 4 containing curved slots 4ª (Figure 4) passed upon studs or bolts 5 from the brackets 2, so that by adjusting the nuts 5ª on the studs or bolts 5, the bearer blocks 3 can be swivelled and set on the brackets 2 as desired.

The bearer blocks 3 are hollowed to receive the squared ends of horizontal members 6 which are locked in said bearer blocks 3 by means of set screws 7, the outer ends of said horizontal members 6 having pivoted thereto arms 8 across which is secured a spreader blade 9 slightly curved in cross section, if necessary to stiffen same.

The arms 8 carrying the spreader blade 9 are caused to project horizontally from the back of the machine, with the blade 9 raised clear of the ground when not required to be used, by tension springs 10 attached to the arms 8 and also connected with standards 11 rising from the horizontal members 6.

In order to provide for adjustment of the tension springs 10, the latter are secured at their upper ends to hooks 12 the threaded stems of which are adjustable by nuts 13, through bridge pieces 13ª pivoted in the standards 11.

The spreader blade 9 is bolted to extensions 14ª from members 14 slidable on the arms 8, said members 14 being capable of being secured in desired positions on the arms 8 by means of set screws 15, while the spreader blade 9 is attached to the extensions 14ª by bolts 16 one of each pair of which is an eye bolt.

Chains 18 one at each side of the machine are attached to eyebolts 16 through the blade 9 near the ends thereof, said chains each passing forwardly through guides 19 and then below a guide pulley 20, on the machine frame 1 near the front end of the scoop 22 when the latter is lowered, the forward ends of the chains 18 being secured to the scoop (Figures 1 and 5).

Upon the scoop 22 being tilted backwards to deliver its load by the usual means provided for the purpose the chains 18 upon the slack therein being taken up pull the arms 8 carrying the spreader blade 9 downwards to a vertical position behind the machine (indicated dotted in Figure 1) whereby said blade is brought to a position with an edge uppermost, across the back of the machine, and as long as the scoop 22 remains in its raised position, the spreader blade 9 is held in said position whereby spreading of the material tipped from the scoop 22 will be effected by said blade 9, as the machine travels forward.

Sufficient slack is provided in the chains 18 so that the first portion of the raising or tilting backwards of the scoop 22, does not affect the spreader blade 9, and it is only during the last portion of the raising or tilting of the scoop 22 that a pull is exerted on the chains 18, and the blade 9 is brought to its vertical position at the back of the machine in readiness to spread the material delivered from the scoop, as the machine travels forwards.

The depth or thickness at which the material is to be spread is determined by adjusting the members 14 to or from the outer ends of the arms 8, as may be required, to give less or greater clearance of the blade 9 from the ground respectively, when said blade is in its vertical or spreading position.

The spreading blade 9 can also be used as a grader, by adjusting the bearer blocks 3 on the swivel pins 2a, and the horizontal members 6 in said blocks 3, in order that the blade 9 will be set, so that when lowered, one of its ends will be in advance of its other end whereby material engaged by the blade 9 will then be diverted or swept to one side of the machine, the height of the blade 9 from the ground being regulated as before described.

When the blade 9 is used with one end in advance of the other the length of the connecting chains 18 requires to be adjusted and in order to facilitate the adjustment of said chains to the required lengths, the latter are provided at predetermined intervals with knots or knobs 22a any selected one of which can be made to engage the hook or open loop 23 on the scoop 22, through which it is passed, to give the necessary working length to the chain.

As the scoop 22 is returned to its position for scraping or scooping up another load, the spreader blade carrying arms 8 return to their horizontal portions under the action of the springs 10 attached thereto, the blade 9 assuming its raised position before the scoop 22 is right down, continued downward movement of the latter resulting in the slackening of the chains 18, and as the latter are liable to become entangled with the guide pulleys 20, guards 24 are provided one at each side of the machine for keeping said chains clear of said pulleys.

What I do claim and desire to obtain by Letters Patent of the United States of America is:—

1. An attachment for scraping and scooping machines, comprising a spreader blade mounted at the rear of the machine, and capable of being raised and lowered; a scoop tiltably mounted on said machine; connections between said scoop and said blade, whereby the latter is brought to an operative position, by the action of the scoop in delivering its load, and means for returning the blade to an inoperative position.

2. An attachment for scraping and scooping machines, as in claim 1, wherein the spreader blade is mounted on arms hinged to the machine and is operable vertically.

3. An attachment for scraping and scooping machines, as in claim 1, wherein the connection between the blade and the scoop comprise chains passing around guide pulleys on the machine, and attached to that portion of the scoop which rises when the latter is tilted and wherein springs are provided to return the blade to its inoperative position.

4. An attachment for scraping and scooping machines, comprising a blade mounted across a pair of arms hinged to the back of the machine; a scoop tiltably mounted on said machines; connections between said blade and said scoop for pulling the former down when the scoop is tilted to discharge its load, and means attached to said arms for bringing same to a raised position.

5. An attachment for scraping and scooping machines, as in claim 4, wherein the blade is secured to members adjustable on said arms.

6. An attachment for scraping and scooping machines, as in claim 4, wherein the arms are hinged to members adjustably secured to the machine.

7. An attachment for scraping and scooping machines, as in claim 4, wherein the arms are hinged to members adjustable in bearer blocks, capable of being swivelled on the machine.

8. An attachment for scraping and scooping machines, as in claim 4 wherein the arms are hinged to members secured on the back of the machine; said members having thereon standards to which said arms are connected by tension springs.

In testimony whereof I affix my signature.

DAVID JOSEPH HILL.